United States Patent
Hammer et al.

(10) Patent No.: US 6,902,783 B1
(45) Date of Patent: Jun. 7, 2005

(54) EDIBLE MOLDED BODIES, ESPECIALLY FLAT AND FLEXIBLE TUBULAR FILMS

(75) Inventors: Klaus-Dieter Hammer, Mainz (DE); Gerhard Grolig, Moerfelden-Walldorf (DE); Michael Ahlers, Mainz (DE); Ulrich Delius, Frankfurt (DE)

(73) Assignee: Kalle Nalo GmbH & Co., Wiesbaden (DE)

( * ) Notice: Subject to any disclaimer, the term of this patent is extended or adjusted under 35 U.S.C. 154(b) by 0 days.

(21) Appl. No.: 09/355,637

(22) PCT Filed: Dec. 19, 1997

(86) PCT No.: PCT/EP97/07212

§ 371 (c)(1),
(2), (4) Date: Aug. 2, 1999

(87) PCT Pub. No.: WO98/34490

PCT Pub. Date: Aug. 13, 1998

(30) Foreign Application Priority Data

Feb. 7, 1997 (DE) .......................... 197 04 737

(51) Int. Cl.$^7$ .............................. A23B 4/10; A23P 1/12
(52) U.S. Cl. .................... 428/34.8; 728/35.6; 728/36.9; 728/36.91; 728/910; 426/105; 426/106; 426/129; 426/135; 426/138; 452/30; 452/35; 138/118.1
(58) Field of Search .............................. 428/34.8, 35.6, 428/36.9, 910, 36.91; 426/105–106, 129, 135, 138; 452/30, 35; 138/118.1

(56) References Cited

U.S. PATENT DOCUMENTS

| | | | | |
|---|---|---|---|---|
| 3,535,125 A | | 10/1970 | Fagan | .......................... 99/176 |
| 4,002,710 A | * | 1/1977 | Hammer et al. | ............ 264/183 |
| 4,154,857 A | * | 5/1979 | Higgins | ....................... 426/278 |
| 5,300,319 A | * | 4/1994 | Robertson et al. | ........... 427/243 |
| 5,679,145 A | * | 10/1997 | Andersen et al. | ........ 106/162.5 |
| 5,681,517 A | * | 10/1997 | Metzger | ..................... 264/202 |
| 5,928,737 A | * | 7/1999 | Hammer et al. | ........... 428/34.8 |

FOREIGN PATENT DOCUMENTS

| | | |
|---|---|---|
| DE | 1 213 211 | 3/1966 |
| DE | 1 792 627 | 4/1972 |
| DE | 43 09 528 | 9/1994 |
| DE | 4438961 | 5/1996 |
| EP | 0 709 030 | 5/1996 |
| EP | 0 733 306 | 9/1996 |
| EP | 0 820 698 | 1/1998 |

OTHER PUBLICATIONS

Lim et al., Sep. 31, 1993, WO 93/19125.*
Official USPTO English Translation of DE 4438961.*

* cited by examiner

Primary Examiner—Harold Pyon
Assistant Examiner—Sow-Fun Hon
(74) Attorney, Agent, or Firm—Foley & Lardner LLP

(57) ABSTRACT

The invention relates to edible molded bodies in the form of a flat or tubular film based on plastifiable biopolymers, the cleavage products or derivatives thereof and/or synthetic polymers from natural monomers, characterized in that they are produced according to a method comprising the following steps: a) the biopolymers, cleavage products or derivatives thereof and/or synthetic polymers are mixed with at least one edible plasticizer, at least one lubricating agent and at least one cross-linking agent, b) the mixture thus obtained is melted into a thermoplastic material, c) said material is extruded and d) the product obtained by extrusion is calendered and/or stretched or blown and deformed into the edible molded body. The molded bodies cited in the invention are suitable for use as food wrappers for sausages and boiled ham, and are particularly suitable for use as seamless sausage casings.

28 Claims, No Drawings

EDIBLE MOLDED BODIES, ESPECIALLY FLAT AND FLEXIBLE TUBULAR FILMS

This application is a 371 of PCT/EP97/07212, filed Dec. 19, 1997.

BACKGROUND OF THE INVENTION

The invention relates to edible shaped bodies based on plastifiable biopolymers, cleavage products or derivatives thereof and/or synthetic polymers made from natural monomers. They are mainly used as packaging films, and sausage casings.

As edible sausage casings, there have proved useful, in addition to natural casings (for bockwurst especially sheep gut), only collagen films and tubes (DE-B 17 92 627 and U.S. Pat. No. 3,535,125). Edible casings based on calcium alginate (DE-B 12 13 211) have not been able to establish themselves.

Edible collagen films and tubes are produced from cattle hides by a very complex and environmentally-polluting process. The hides are digested with acids (e.g. lactic acid) until the fibrils are obtained; the high-viscosity mass is extruded and precipitated and consolidated slowly and compactly using gaseous $NH_3$ or with $NH_4OH$. During drying, crosslinking (curing) then takes place, which strengthens the products to the extent that they withstand the scalding process without any significant loss of mechanical stability.

In contrast, it has not been possible to give the alginate-based sausage casings the necessary stability. In the case of these casings, owing to the action of the sausage emulsion and the brine, the poorly soluble calcium salt is gradually converted into the readily soluble sodium salt of alginic acid. The casings as a result lose their strength.

SUMMARY OF THE INVENTION

It was the object of the invention to provide edible shaped bodies, in particular flat and tubular films, which no longer have the abovedescribed disadvantages. In addition, they are to be able to be produced from natural raw materials in a simple, inexpensive and environmentally friendly manner. For the use as sausage casings, in addition, the tubular films are to have the required functional properties. In addition to the mechanical, swelling and shrinkage properties, these include especially sufficient heat stability, scalding stability and hydrolysis stability. This means they must also be sufficiently resistant to the hot water or superheated steam used for the scalding.

DETAILED DESCRIPTION OF THE INVENTION

The object is achieved by providing an edible shaped body in, the form of a flat or tubular film based on plastifiable biopolymers or cleavage products or derivatives thereof and/or synthetic polymers of natural monomers which is produced by a process having the following stages:

a) mixing the biopolymers, cleavage products or derivatives thereof and/or the synthetic polymers with at least one edible plasticizer, at least one lubricant and at least one crosslinker, b) melting the resultant mixture to give a thermoplastic mass, c) extruding this mass and d) calendering and/or stretching or blowing the product obtained from the extrusion to give the edible shaped body.

In a preferred embodiment, the biopolymers, the cleavage products thereof and/or the synthetic polymers are first mixed with the plasticizer and the lubricant and processed to form a thermoplastic mass. Not until then is this mass admixed with the crosslinker and extruded.

The edible shaped body can also have a different shape than that of a flat or tubular film. Instead of stage d), or in addition to this stage, if appropriate, other shaping processes then occur, such as injection molding or thermoforming. An example of a shaped body produced in this manner is edible table utensils.

The process stages c) and d) need not follow one another directly. It is also possible to store the extruded mass in the interim, e.g. in the form of granules. If it is desirable or required for the respective application, the flat films or tubes of the invention can in addition be partly or completely heat-set.

Depending on the shape of the die (annular or slit-shaped), sheets or tubes form during the extrusion from the thermoplastic mixture, and can then be converted, by calendering and/or stretching in the longitudinal and/or transverse direction, or by blowing, into flat films or seamless tubular films. If required, the material is heated during the blowing, calendering or stretching (again). The edible flat or tubular films of the invention generally have a thickness or wall thickness of from 20 to 120 $\mu$m, preferably from 30 to 60 $\mu$m. In the case of the tubular films, the wall thickness generally increases with increasing internal diameter. By means of the stretching or blowing, the shaped body gains further mechanical strength.

The shaped body of the invention has the particular advantage that it may be produced in a particularly environmentally friendly manner without special precipitation and wash baths or any other sorts of baths. In the production process, the generally customary apparatuses for mixing and extrusion, in particular kneaders and single- or twin-screw extruders, can be used.

Preferred examples of the plastifiable biopolymers, of their likewise plastifiable cleavage products or derivatives and of plastifiable synthetic polymers are thermoplastic starch, starch derivatives (in particular starch esters, especially starch acetates and starch propionates; and in addition also starch ethers, especially starch alkyl ethers), extrudable gelatins and other natural proteins, such as maize protein, wheat protein and rapeseed protein, casein and is derivates, chitin and chitosans, alginic acids and alginates, carrageenan (a galactose polysaccharide produced from seaweed), dextran, galactomannans (from carob bean meal, guar gum), pectins (polygalacturonic acids and methyl esters thereof) and polylactic acid (=polylactides). For the shaped bodies of the invention, there is thus a broad selection of starting materials of vegetable and animal origin available. Collagen is unsuitable. It is not available in consistent quality. The content of the biopolymers or cleavage products or derivatives thereof and/or of the synthetic polymers is generally from 10 to 90% by weight, preferably from 15 to 80% by weight, in each case based on the total weight of the shaped body.

Preferably, two or more of the starting materials are used together. They are expediently uniformly mixed and plastified at relatively high temperatures by relatively long kneading in a twin-screw extruder in the presence of a plasticizer, a plasticizing aid (=lubricant), a hardener (=crosslinker) and, if appropriate, a filler.

Suitable plasticizers are glycerol, diglycerol, sorbitol, sorbitol esters, triglycol, carboxymethylcellulose and other compounds which are suitable for food contact and are preferably already officially approved. The content of the plasticizer is generally from 0.5 to 50% by weight, preferably from 2 to 25% by weight, in each case based on the total weight of the shaped body.

Suitable plasticizing aids or lubricants are, especially, vegetable oils, in particular sunflower seed oil, rapeseed oil, olive oil and poppyseed oil. In addition, compounds suitable for use in foods, such as lecithins, triethyl acetylcitrate, sucrose esters, lactones (such as 12-hydroxystearic lactone), lactams and synthetic triglycerides. The content of lubricant (s) is generally from 2 to 30% by weight, preferably from 5 to 20% by weight, in each case based on the total weight of the shaped body.

Hardeners or crosslinkers which can be used are caramel (caramelized sugar, maillose), woodsmoke condensate, sugar aldehydes, dialdehydes (especially glyoxal and glutardialdehyde), dicarboxylic acids (particularly aliphatic dicarboxylic acids, such as oxalic acid, malonic acid, adipic acid and succinic acid), dicarboxylic anhydrides (partiuclarly adipic-acetic, anhydride=diacetyl adipate), di- or triisocyanates (especially hexamethylene diisocyanate) and di- or triepoxides, polysaccharide aldehydes (particularly dialdehyde starch, dialdehyde alginic acid, dialdehyde pectic acid, dialdehyde gum tragacanth and dialdehyde gum arabic). Generally, suitable crosslinkers are those compounds which contain at least two reactive groups. The content of crosslinker(s) is generally from 0.2 to 30% by weight, preferably from 0.5 to 25% by weight, particularly preferably from 1 to 10% by weight, in each case based on the total weight of the shaped body.

For edible films, which are, for example, to be used for wrapping cooked ham, and are thus not exposed to high mechanical loading, crosslinkers of relatively weak action are sufficient, such as dicarboxylic acids, sugar aldehydes (mono- and-disaccharides) or caramel. Sausage casings which are exposed to a higher mechanical load, especially during stuffing, and must also withstand the scalding process undamaged, in contrast, should be considerably more intensively crosslinked, which can be achieved particularly well by the use of a plurality of crosslinkers. For these, in addition, use may be made of dialdehydes, such as glyoxal or glutardialdehyde, di- or triisocyanates or di- or triepoxides.

To strengthen the shaped bodies of the invention, the mixture, if appropriate, can further comprise fibers, preferably woodpulp fibers or cotton linters, and/or pigments, in particular inorganic pigments such as calcium carbonate.

Woodpulp fibers having a length of from 0.2 to 5 mm, preferably from 0.5 to 2 mm, are particularly suitable. The fiber content is expediently from 2 to 30% by weight, preferably from 5 to 20% by weight, in each case based on the total weight of the shaped body.

Although the short pulp fibers which act to strengthen are not digestible, as dietary fiber they do promote digestion. They are preferably disposed in a compact middle layer by using special dies, i.e. a layer of a fibrous polymer pulp is extruded into two fiber-free layers. It is also certainly possible to distribute the fibers over the entire cross-sectional area, i.e. to extrude only one fibrous polymer mixture. It is frequently advantageous to incorporate, in addition to the fibers, fillers, such as leather shavings.

As polymeric starting material, particular preference is given to mixtures of thermoplastic starch with an extrudable protein, particularly preferably gelatin. The ratio of starch to protein in this case is generally from 95:5 to 5:95. To improve stability to moisture and heat, in addition, chitosan or pectin can be added in an amount of from 3 to 30% by weight, preferably from 5 to 20% by weight, in each case based on the total weight of the polymer mixture. Mechnical stability can be increased still further if the thermoplastic starch is completely or partially replaced by starch acetate. By mixing in from 5 to 25% by weight, preferably from 8 to 22% by weight, of glycerol (in each case based on the total weight) and from 2 to 20% by weight, preferably from 5 to 15% by weight, of a natural oil, e.g. sunflower seed oil, the mixture is made soft and flowable, to simplify extrusion.

For hardening, in a preferred embodiment, from 0.8 to 5% by weight, preferably from 1 to 3% by weight, of caramel and, in addition, from 0.5 to 10% by weight, preferably from 1 to 5% by weight, of a dicarboxylic acid, such as oxalic acid, malonic acid or succinic acid, are mixed in.

For edible sausage casings it is expedient to add from 1 to 10% by weight, preferably from 2 to 6% by weight (based on total weight of all components) of a dialdehyde, such as glyoxal or glutardialdehyde, a diisocyanate, such as hexamethylene diisocyanate, a diketene, a diepoxide, a lactam or lactone (e.g. 6-gluconolactone). The mixture is melted and uniformly mixed by relatively long kneading at from 90 to 170° C., preferably at from 95 to 150° C. The melt can then either be immediately extruded or granulated for later processing.

The edible seamless tubes in a caliber range from 16 to 50, preferably from 18 to 30, are expediently produced by extruding through a ring die, followed by blowing. The area stretching ratio during blowing is generally from 1:5 to 1:20, preferably from 1:6 to 1:10, particularly preferably about 1:8.

The tubes can then, in a subsequent process step, be treated internally or internally and externally and thus further modified in their properties. In particular, post-hardening can be carried out here, either using ionizing radiation, e.g. with X-rays, or with the abovementioned hardeners and crosslinkers. These can then be applied in the form of solutions or dispersions. The tubes are then (as usual) dried in the inflated state between two pairs of squeeze rolls. This is followed by a generally known manufacturing step. Generally, the tubes are gathered in sections and the resultant shirred sticks are processed on conventional machines. The seamless tubular films are particularly suitable as sausage casings, in particular for small sausages. In addition, the shaped bodies of the invention are also suitable for packaging other foods, e.g. cheese.

The broad base of natural starting polymers, additives and crosslinkers in addition makes possible a very broad variation of the properties expected of food casings, so that shaped bodies may be adapted precisely to highly specific requirements, as shown by the following examples. Percentages are percentages by weight, unless stated otherwise.

EXAMPLE 1 a) Preparation of Thermoplastic Starch:

100 kg of potato starch were dried under reduced pressure to a water content of less than 0.3% and melted and well mixed with 50 kg of glycerol (99% pure) in a kneader at from 160 to 190° C.; to abolish the helix structure of the starch, the melt was kept for 2 h at 170° C.; the mass was then extruded and granulated. On subsequent storage of the granules, the starch remained in the amorphous state.

b) Blending and Production of a Film:

| 50 kg | of the granules under a) (33.3 kg of starch + 16.7 kg of glycerol) were admixed with: |
|---|---|
| 25 kg | of extrudable gelatin, |
| 10 kg | of woodpulp fibers, |
| 2 kg | of sorbitol, |
| 4 kg | of malonic acid, |
| 8 kg | of sunflower seed oil and |
| 1 kg | of caramel |

The mixture was melted at 160° C. in an extruder, uniformly dispersed and extruded through a 40 cm flat-film die, stretched (stretching ratio in the machine direction 1:4, in the transverse direction 1:10), cooled, conditioned to 8% moisture content and wound up. The properties of the film produced in this manner are given in the table below:

| Weight $gm^2$ | Thickness $\mu m$ | Ultimate tensile strength (dry) $N/mm^2$ | | Elongation at break in % | | Swelling value % |
|---|---|---|---|---|---|---|
| | | longi-tudinal | trans-verse | longi-tudinal | trans-verse | |
| 42 | 35 | 28 | 18 | 15 | 22 | 180 |

Meat products, in particular cooked ham, were wrapped with this film and covered with a net. After cooking, the net could be removed without problems. The cooked ham was then sliced together with the film casing. The film was oxygen- and smoke-permeable, but had low liquid- and fat-permeability.

EXAMPLE 2

| 40 kg | of partially acetylated starch having a degree of substitution of 2.2, |
|---|---|
| 25 kg | of extrudable gelatin, |
| 5 kg | of chitosan, |
| 20 kg | of glycerol, |
| 3 kg | of caramel, |
| 2 kg | of hexamethylene diisocyanate and |
| 5 kg | of sunflower seed oil | were thoroughly mixed. The mixture was melted at a temperature from 170 to 180° C., then kept at 175° C. for 30 min and then extruded as a film through an 80 cm flat-film die, stretched, longitudinally 1:6, transversely 1:8), heat-set, conditioned (to a moisture content of 10%) and wound up. The properties of the film produced in this manner are given in the table below:

| Weight $gm^2$ | Thickness $\mu m$ | Ultimate tensile strength (dry) $N/mm^2$ | | Elongation at break in % | | Swelling value % |
|---|---|---|---|---|---|---|
| | | longi-tudinal | trans-verse | longi-tudinal | trans-verse | |
| 48 | 40 | 35 | 24 | 12 | 26 | 168 |

The film is suitable for warpping the most varied types of meat products and can be consumed with them.

EXAMPLE 3 a) Preparation of Thermoplastic Starch:

75 kg of potato starch were dried under reduced pressure to a water content of less than 0.3%, 25 kg of glycerol (99% pure) were added and the mixture was melted and mixed thoroughly in a twin-screw kneader at from 160 to 190° C. The melt was then kept at 175° C. for 2 h, extruded and granulated.

b) Blending and Production of a Tube:

| 51 kg | of the granules under a) were admixed with: |
|---|---|
| 20 kg | of extrudable gelatin, |
| 10 kg | of chitosan, |
| 10 kg | of sunflower seed oil, |
| 5 kg | of malonic acid, |
| 2 kg | of glyoxal and |
| 2 kg | of caramel. |

This mixture was melted at 175° C. in an extruder, mixed thoroughly and extruded through an annular die having a diameter of 20 mm; between the die and the first guide roll, the tube was stretched by inflation longitudinally and transversely in a ratio of 1:8 (based on the area), cooled, laid flat and wound up.

In the water-soaked state, the tube had a bursting pressure of 32 kPa and a static extension at 21 kPa of 23 mm. The wall thickness was 30 $\mu m$, and the weight was 40 g/m². The shirred sticks were stuffed with sausage emulsion on an automated stuffing machine, scalded, smoked and packaged.

EXAMPLE 4

A mixture of

| 30 kg | of extrudable gelatin, |
|---|---|
| 20 kg | of starch granules as under 3b), |
| 20 kg | of partially acetylated starch (® Sconacell S), |
| 10 kg | of glycerol, |
| 10 kg | of sunflower seed oil, |
| 5 kg | of glyoxal and |
| 5 kg | of caramel | was melted. A third of this melt was then mixed in a separate extruder with woodpulp fibers of a length of from 0.5 to 1.5 mm. Using a special die having a diameter of 18 mm, a three-layer tube was then produced by coextrusion, the inner and outer layers of which tube were fiber-free, while the central layer was fibrous. The tubular casing comprised 12% of fibers, based on the total weight.

Between die and tube roll, the tube was stretched by inflation, cooled, conditioned (10% by weight of moisture content), wound up and shirred. In the water-soaked state, the tube had a bursting pressure of 36 kPa, a static elongation at 21 kPa of 22 mm, a wall thickness of 32 $\mu m$ and a weight of 38 g/m².

The shirred sticks were stuffed with sausage emulsion on automated stuffing machines, scalded and smoked.

EXAMPLE 5

A melt was produced from

| | |
|---|---|
| 30 kg | of extrudable gelatin, |
| 20 kg | of partially acetylated starch, |
| 10 kg | of pectin, |
| 20 kg | of glycerol, |
| 10 kg | of olive oil, |
| 5 kg | of glutaraldehyde and |
| 5 kg | of $CaCO_3$ | and extruded as described in Example 3 to form a tube of caliber 20. It had the same properties as the tube described in Example 3.

EXAMPLE 6

50 kg of potato stach (not dried) were kneaded with
10 kg of water and
10 kg of glycerol
at from 100 to 120° C. for 2 hours. A substantial part of the water evaporated in the course of this. The resultant mass was mixed with 10 kg of glycerol and 1 kg of glyoxal and extruded at 140° C. as described above through an annular die having a diameter of 20 mm and blown (area stretching ratio: 1:6). The properties of the film thus produced are given in the table below:

| Weight $gm^2$ | Thickness $\mu m$ | Ultimate tensile strength (dry) $N/mm^2$ | | Elongation at break in % | | Swelling value % |
|---|---|---|---|---|---|---|
| | | longi-tudinal | trans-verse | longi-tudinal | trans-verse | |
| 38 | 40 | 32 | 24 | 15 | 20 | 120 |

What is claimed is:

1. An edible shaped body in the form of a flat or tubular fiber containing film; wherein the edible shaped body exhibits a longitudinal elongation at break of 12–15% and a transverse elongation at break of 20–26%; wherein the thickness or wall thickness of the edible shaped body is from 20 to 60 $\mu m$; wherein the edible shaped body does not contain collagen; wherein the edible shaped body is based on biopolymers or cleavage products or derivatives thereon and/or synthetic polymers of natural monomers; and wherein the edible shaped body is produced by a process having the following stages:
    a) mixing the biopolymers, cleavage products or derivatives thereof and/or the synthetic polymers with at least one edible plasticizer, at least one lubricant and at least one crosslinker and fibers;
    b) melting the resultant mixture to give a thermoplastic mass;
    c) extruding this mass; and
    d) calendaring and/or stretching or blowing the product obtained from the extrusion to give the edible shaped body.

2. The shaped body as claimed in claim 1, wherein the biopolymer, the cleavage products produced therefrom and/or the synthetic polymer is thermoplastic starch, a starch derivative, an extrudable natural protein, casein or a casein derivate, chitin, chitosan, alginic acid, alginate, carrageenan, dextran, galactomannan, pectin or polylactic acid.

3. The shaped body as claimed in claim 1, wherein the content of biopolymer, cleavage products and derivatives thereof and synthetic polymers of natural monomers is from 10 to 90% by weight, based on the total weight of the shaped body.

4. The shaped body as claimed in claim 1, wherein the plasticizer is glycerol, diglycerol, sorbitol, sorbitol ester, triglycol or carboxy methylcellulose.

5. The shaped body as claimed in claim 1, wherein the content of plasticizer(s) is from 0.5 to 50% by weight, based on the total weight of the shaped body.

6. The shaped body as claimed in claim 1, wherein the lubricant is a vegetable oil, rapeseed oil, olive oil and poppyseed oil, or a lecithin, triethyl acetylcitrate, a sucrose ester, a lactone, a lactam or a synthetic triglyceride.

7. The shaped body as claimed in claim 1, wherein the content of lubricant(s) is from 2 to 30% by weight, based on the total weight of the shaped body.

8. The shaped body as claimed in claim 1, wherein the crosslinker is carmel, a wood smoke concentrate, a sugar aldehyde, a dialdehyde, a dicarboxylic acid, a dicarboxylic anhydride, a di- or triisocyanate, a di- or tri-epoxide or a polysaccharide aldehyde.

9. The shaped body as claimed in claim 1, wherein the content of crosslinker(s) is from 0.2 to 30% by weight, based on the total weight of the shaped body.

10. The shaped body as claimed in claim 1, wherein the fibers comprise woodpulp fibers or cotton linters.

11. The shaped body as claimed in claim 10, wherein the woodpulp fibers have a length of from 0.2 to 5 mm.

12. The shaped body as claimed in claim 1, wherein the content of fibers is from 2 to 30% by weight, based on the total weight of the shaped body.

13. The shaped body as claimed in claim 1, wherein it comprises pigments.

14. The shaped body as claimed in claim 1, wherein it includes three layers and only the central layer comprises fibers.

15. The shaped body as claimed in claim 1, wherein it is post-hardened.

16. The shaped body as claimed in claim 1, wherein the content of biopolymer, cleavage products and derivatives thereof and synthetic polymers of natural monomers is from 15 to 80% by weight, based on the total weight of the shaped body.

17. The shaped body as claimed in claim 1, wherein the content of plasticizer(s) is from 20 to 25% by weight, based on the total weight of the shaped body.

18. The shaped body as claimed in claim 1, wherein the content of lubricant(s) is from 5 to 20% by weight, based on the total weight of the shaped body.

19. The shaped body as claimed in claim 1, wherein the content of crosslinker(s) is from 0.5 to 25% by weight, based on the total weight of the shaped body.

20. The shaped body as claimed in claim 10, wherein the woodpulp fibers have a length of from 0.5 to 2 mm.

21. The shaped body as claimed in claim 1, wherein the content of fibers is from 5 to 20% by weight, based on the total weight of the shaped body.

22. The shaped body as claimed in claim 1, wherein the thickness or wall thickness of the edible shaped body is from 30 to 60 $\mu m$.

23. A food product comprising a foodstuff packaged in the shaped body according to claim 1.

24. An edible shaped body according to claim 1, comprising a sausage casing.

25. An edible shaped body according to claim 1, comprising a seamless sausage casing.

26. An edible shaped body according to claim 1, wherein the fiber containing film comprises non-digestible dietary fiber.

27. A consumable sausage comprising (i) a meat product and (ii) an edible shaped body according to claim 1 encasing the meat product, wherein the edible shaped body is intended to be consumed with the meat product.

28. A method of using an edible shaped body according to claim 1, comprising:
(a) filling the edible shaped body with a meat product; and
(b) consuming the meat product together with the edible shaped body.

* * * * *